United States Patent [19]
Ekberg

[11] Patent Number: 4,654,841
[45] Date of Patent: Mar. 31, 1987

[54] METHOD OF TRANSFERRING INFORMATION VIA A DIGITAL TELECOMMUNICATION NETWORK AND NETWORK FOR SUCH TRANSFERRING

[75] Inventor: Freddie S. Ekberg, Vaxholm, Sweden

[73] Assignee: Telefonaktiebolaget LM Ericsson, Stockholm, Sweden

[21] Appl. No.: 626,864

[22] Filed: Jun. 29, 1984

[30] Foreign Application Priority Data

Dec. 1, 1982 [SE] Sweden .............................. 8206865-1

[51] Int. Cl.$^4$ ........................................... H04Q 11/04
[52] U.S. Cl. ........................................ 370/16; 370/86; 370/68.1
[58] Field of Search .............. 179/18 EA; 370/16, 86, 370/58

[56] References Cited

U.S. PATENT DOCUMENTS

| | | | |
|---|---|---|---|
| 3,111,559 | 11/1963 | Jacobaeus et al. | 179/18 EA |
| 3,231,676 | 1/1966 | Carlström et al. | 179/18 EA |
| 4,129,750 | 12/1978 | Mattern | 179/18 EA |
| 4,189,624 | 2/1980 | Mattern | 179/18 EA |
| 4,195,351 | 3/1980 | Barner et al. | 179/18 EA |
| 4,276,643 | 6/1981 | Laprie et al. | 370/16 |
| 4,284,852 | 8/1981 | Szybicki | 179/18 EA |
| 4,370,744 | 1/1983 | Hirano et al. | 370/16 |

Primary Examiner—Douglas W. Olms
Assistant Examiner—Kenneth J. Rokoff
Attorney, Agent, or Firm—Roberts, Spiecens & Cohen

[57] ABSTRACT

Two-way time division multiplex (TDM) links interlace a plurality of digital exchanges such that the possibility of path selection is available for transferring information between two of the exchanges. Instead of conventionally selecting a path for each ordered call set up, the exchanges coact such that there is generally established a one-way TDM loop between all exchanges, this loop being established by parts of said links. For calls between arbitrary exchanges the loop only is used. The operational ability of the links is monitored continuously before and after establishment of the loop. It is possible to reconfigurate the loop during calls in progress for achieving improved information transfer quality.

4 Claims, 1 Drawing Figure

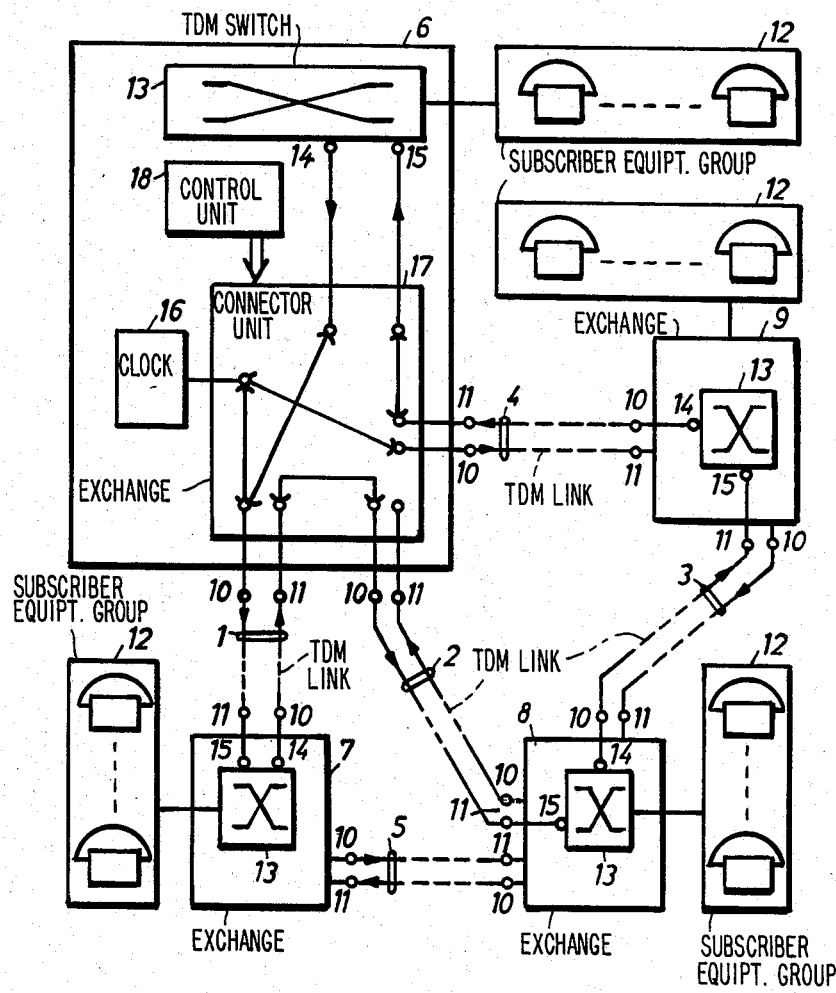

METHOD OF TRANSFERRING INFORMATION VIA A DIGITAL TELECOMMUNICATION NETWORK AND NETWORK FOR SUCH TRANSFERRING

TECHNICAL FIELD

The present invention relates to a method of transferring information via a digital telecommunication network and to a digital communication network for utilizing the method. The telecommunication network includes digital exchanges, mesh-like interconnected by means of two-way time division multiplex (TDM) links. In this case there is a meshed network when there is the possibility of path selection for transferring information between two of the network exchanges. The proposed network consequently includes at least three exchanges, which are each provided with connection points for connecting a number of the two-way links. The exchanges each include a generator for generating a clock pulse and a synchronizing signal pattern, and a digital TDM switch connected to an associated subscriber equipment group with first and second switch terminals being used to transfer information coming from the group and going to the group, respectively.

BACKGROUND ART

For transferring information via a meshed network, path selection principles have so far been applied which have the common object of utilizing the total transfer capacity of the network, i.e. the avoidance as far as possible of traffic congestion. According to the principle described in the U.S. Pat. No. 3,111,559, each call connection is started by scanning the engagement condition of all the paths for the desired information transfer between two exchanges, and the unengaged path first discovered is used for the connection. With stored program controlled meshed network systems, path selection is controlled by centralized or decentralized path selecting units, which select, e.g. according to the U.S. Pat. No. 3,231,676, the most suitable path for the information transfer in question. The path selection process is here more complicated than the subsequent call connection process.

In telecommunication systems with a total traffic density which is seldom greater than the traffic capacity of a link between two exchanges, the very sophisticated path selection functions of a meshed network are avoided by arranging from the start an encircling loop, instead of the meshed network, all the exchanges in the system being connected to the loop. The calls are then set up with the aid of simple control functions, but traffic congestion is obtained when all the information transfer channels of the loop are already engaged. Loop systems are more vulnerable than meshed network systems. Arranging a single one-way encircling loop, the whole system will fail due to a single loop failure. Vulnerability decreases if spare loops are arranged, and decreases still further if the formation of a composite loop is enabled from fault-free parts of different original loops. Conventional loop systems are offered, e.g. by International Business Machines Corporation under the designation "IBM 8100 Information System", but users such as police, military services, airports, petro-chemical plants etc., requiring a telecommunication system which is as invulnerable as possible, have so far had to rely on conventional meshed networks with complicated control functions for path selection and call connection, although the information transfer capacity of a loop system would have been sufficient.

DISCLOSURE OF INVENTION

In the use of the information transfer method and telecommunication network in accordance with the invention, there is obtained the ruggedness which characterizes a meshed network in combination with the simple distributed exchange control functions characterizing information transfer by a digital loop system. At the same time, there is avoided the above-mentioned disadvantages with conventional meshed networks and failure risks of conventional loop networks.

The chief inventive concept is to build up firstly a meshed network, but then to start each operation period by establishing a one-way encircling TDM loop, known per se, which connects all the network exchanges in series and by which information is transferred between different subscriber equipment groups during this operation period. Upon changes in the meshed network due to moving an exchange, the incorporation of a new exchange, or a fault occurring in a TDM link included in the existing loop, a new operation period is started by means of establishing a new loop. It is possible to carry out a reconfiguration of the loop during information transfer in progress without changing associated connection data defining for this transfer, the pertinent subscriber equipments and the TDM channel being used on the loop. Such a reconfiguration, which is carried out practically without disturbances, is achieved in accordance with the invention by continuously monitoring all the TDM links of the network.

The characterizing features of the invention are disclosed in the claims.

BRIEF DESCRIPTION OF THE DRAWINGS

The invention will now be described in detail with reference to the accompanying drawing whose sole FIGURE illustrates two-way TDM links 1-5, which mesh-like interconnected digital exchanges 6-9. Each of the exchanges is connected to a subscriber equipment group 12 and includes a TDM switch 13, a generator 16 for generating a clock pulse and synchronizing signal pattern, a connecting unit 17 and a control unit 18.

BEST MODE FOR CARRYING OUT THE INVENTION

The proposed method of transferring information between subscriber equipments associated with different subscriber equipment groups via a meshed telecommunication network is particularly suitable, when parallel to the need for information transfer within a group, there is a global need for information transfer between the groups, which is covered by the transfer capacity of a TDM link. In building up the network, each subscriber group forms an individual digital exchange unit for internal group calls, and the exchange units lay out the TDM links between themselves. The drawing illustrates a digital network, the construction of which has reached the point where five two-way TDM links 1-5 mesh-like interconnected four digital exchanges 6-9. The exchanges are provided with connection points 10 and 11 for connecting TDM links for the information transfer direction departing from the exchange and arriving thereto, respectively. Subscriber equipment groups 12 are indicated on the drawing, and each of these is associated with its respective exchange 6-9, and is connected to a digital TDM switch 13, which is provided with a first switch terminal 14, via which is transferred information coming from the associated subscriber equipment group, and with a second switch terminal 15, via which information is transferred which goes to the group. The drawing does not show how the switches 13 are conventionally controlled for setting up internal group calls and global calls passing the terminals 14 and 15.

The proposed telecommunication network comprises essentially like modules, each being disposed in a exchange and including in addition to the TDM switch 13 mentioned above, a conventional generator 16 for generating a clock pulse and a synchronizing signal pattern, a connecting unit 17 connected to the connection points 10 and 11, to the switch terminals 14 and 15, and to the generator 16 of the exchange, and also including a control unit 18 for controlling connecting unit 17 in cooperation with the remaining such control units of the network. The connecting unit 17 is disposed for conecting the generator 16, on the basis of instructions obtained from the control unit 18, to one of the connection points 10 associated with the transfer direction departing from the exchange, for connecting the first and second switch terminal 14 and 15 to only one of the connection points 10 and 11 associated with the transfer direction departing from and arriving at the exchange, respectively, and for connecting mutually pairs of the connection points not connected to the switch terminals in such way that points associated with different TDM links and different transfer directions form pairs.

The drawing only illustrates the module included in exchange 6 in detail, and illustrates an embodiment according to which its connecting unit 17, due to instructions received from its control unit 18, has connected its generator 16 to two of its connection points 10 which are associated with the TDM links 1 and 4; has connected its switch terminal 14 and 15 to its connection point 10 and 11 which is associated with the link 1 and 4, respectively; and has connected its connection point 11 associated with link 1 to its connection point 10 associated with link 2. There is further indicated on the drawing that the exchange 7 has its switch 13 connected for both transfer directions to the TDM link 1; that the exchange 8 has its switch terminals 14 and 15 connected to the links 3 and 2, respectively; and that exchange 9 has its switch terminals 14 and 15 connected to the links 4 and 3, respectively.

Consequently, according to the drawing, the network control units have established a one-way encircling TDM loop, which connects all the TDM switches 13 of the exchanges in series, the loop from exchange 7 to exchange 8 going via the connecting unit of exchange 6. The TDM generator of the loop consists of the generator 16 in exchange 6. Already during laying out the links, i.e. during building up the meshed network but before the establishment of the loop, in each exchange, the control unit 18 sends or receives network signals via its connection points 10 and 11, respectively. The network signalling for providing coaction between the control units is performed conventionally on the signal channels of the TDM links, and does not require any synchronization of the generators. Each exchange sends it own network signals with the aid of the TDM clock signal generated by its own generator. In conventional TDM systems there are also synchronizing channels apart from channels for call transfer and the mentioned signal channels. The connection of the associated generator 16 and TDM switch 13 to the exchange connection points 10, 11 carried out by the connecting unit 17 of an exchange are durable conventionally for the synchronizing channels and the call channels. For the sake of clarity, the conventional connections between generator 16 and control unit 18 have been left out from the drawing, as well as the conventional signal and synchronizing channel lines between the control unit 18 and the connection points 10 and 11 of the TDM links.

The first network signals which the exchanges send during build-up of the network are identity inquiries. Already at the beginning of the network installation, i.e. in conjunction with laying out the TDM links, one of the exchanges is indicated as the master exchange. The remaining exchanges are slave exchanges. Master indication can be done manually or automatically. In automatic master indication the exchange which first receives an identity inquiry from another exchange indicates itself as master before another exchange has answered the own inquiry. Only the master exchange may deal out identity numbers to itself and to the slave exchanges. Via the TDM links connected to the master exchange, then the master exchange informs, with the aid of conventional handshaking, the slave exchanges about its own identity number and those of the slave exchanges.

Before the above-mentioned one-way encircling loop has been established, each generator 16 is connected by means of the associated connecting unit 17 to the synchronizing channel of all the associated connection points 10 for the departing transmission direction. A conventional synchronizing signal pattern is used, which is identical for all the network generators. The meshed network condition is monitored with the aid of the signal patterns received by the exchange control units via the synchronizing channel on their connection points 11 for the incoming transmission direction. The condition of a TDM link is graded into a plurality of transfer quality levels, depending on how may faults a control unit discovers in a received synchronizing signal pattern.

In general, network signalling is carried out in a manner known per se so that each exchange retransmits a received signal if this signal has not already been sent. There is obtained a rapid spread of the network signals, with the aid of which the exchanges first notify each other of their identity number and then of the transfer quality levels of the installed TDM links. Each control unit 18 includes data memories for storing identity and condition data for the whole of the telecommunication network, which have been determined by the network signalling. In principle, each exchange is therefore capable of establishing a one-way encircling TDM loop. In practice, the master exchange indicated in conjunction with identity number distribution determines a suitable loop configuration, and orders establishment of this loop with the aid of the network connecting units. Each control unit stores all the data for the loop configuration in question in its data memory.

Establishing the loop also includes that only one of the network generators, preferably the master exchange generator, decides the TDM clock pulse for the whole loop. Monitoring of the transfer quality of the TDM links is not complicated by establishment of the loop, if the clock pulse received along the loop is used to synchronize the remaining generators, preferably the generators of the slave exchanges, each of which then sends to the synchronizing channel of the loop a newly generated signal pattern at the received clock pulse rate. Each exchange evaluates incoming synchronizing signal patterns, independent of whether the pattern arrives via the loop or via parts of links which are not part of the loop. In the meshed network and loop configuration selected on the drawing, with exchange 6 as the master exchange, the slave exchange 8 receives, for example, the loop synchronizing signal pattern from link 2, which is originated by the generator in exchange 6, and also the pattern from link 3 and 5 which is generated by the generator in the slave exchanges 9 and 7, respectively. The control unit of the master exchanges 6 receives loop patterns originated by the generators in slave exchanges 7 and 9 and also the pattern from the link 2, which is originated by the generator in the slave exchange 8. The exchanges 6–9 evaluate their received patterns and notify each other of the transfer quality levels thus decided.

However, the above-described network signalling between the control units of the exchanges used during building up the network, ceases after establishment of the loop. Only the speech channels and the signal channel on the one-way encircling TDM loop are used for conventionally transferring call information between different subscriber equipment groups or transferring control information between the exchanges for setting up or taking down calls. In this situation the master exchange distributes the speech channels of the loop, but pertinent call data is stored in the data memories of all exchanges. The quality data of the TDM links is also notified on the encircling loop signal channel to all exchanges after the loop has been established.

If during building up the meshed network, a TDM link is laid out between a newly added exchange and a slave exchange included in an established loop, the slave exchange receives the inquiry signal coming from the new exchange, this signal being then notified by the slave exchange via the loop signal channel to all the other exchanges in the network. The master exchange gives the new exchange its identity number and orders a reconfiguration of the loop, providing that the transfer quality of the newly laid out TDM link is acceptable. As has been mentioned in the introduction, loop reconfigurations are performed during global information transfer in progress without altering the call set up data being used.

A reconfiguration is also justified if the transfer quality is worsened in a part of the loop, or if newly laid out links in the meshed network enable the establishment of a new loop which to a lesser extent includes complete two-way links. In accordance with the embodiment on the drawing, a reconfiguration would be justified for providing a direct transfer via link 5 from exchange 7 to exchange 8 if link 5 has good quality.

Since only the master exchange is allowed to order the first loop establishment, only the master exchange is allowed to order loop reconfiguration. But since all exchanges store all the data over the instant condition of the network, any slave exchange can take over the master function at any time.

I claim:

1. In a digital telecommunication network having at least three similar exchanges wherein each exchange includes a time division multiplex switch having terminals for communicating with an associated subscriber equipment group and for communicating via two-way time division multiplex links to other of the exchanges, the method of establishing a communications path among the exchanges whereby a subscriber equipment in one of the exchanges can communicate with a subscriber equipment in any one of the other exchanges comprising the steps of mechanically interconnecting the exchanges of the plurality by two-way time division multiplex links in such a way that each exchange is connected via one of said two-way time division multiplex links to one of the other exchanges and via another of said two-way time division multiplex links to the other of said other exchanges, establishing one of the exchanges as a master and the other exchanges as slaves, said master generating first signals fed to said slaves for establishing a one-way closed loop among the exchanges, via the exchanges and selected interconnecting time division multiplex links, whereby a second signal emitted by one exchange can pass through all exchanges in the closed loop.

2. The method of claim 1 wherein each exchange monitors the transmission properties of the time division links connected thereto to indicate when the loop is to be reconfigured.

3. A digital communication network for information transfer comprising: a plurality of subscriber equipment groups; a plurality of similar digital exchanges, each servicing a different one of said subscriber equipment groups and having at least one set of incomming transfer points and at least one set of outgoing transfer points; and a plurality of two-way time division multiplex links, each of said links connecting two different exchanges whereby the exchanges are interconnected according to a predefined configuration; each of said digital exchanges comprising synchronizing means for generating clock pulses and a synchronizing pattern, a time division multiplex switch means connected to the associated subscriber equipment groups and first and second signal transfer terminals for transferring information to and from said associated group, a connecting means for (1) connecting said synchronizing means to an outgoing connecting point, (2) connecting said first signal transfer terminal to an outgoing connecting point, (3) connecting said second signal transfer terminal to an incomming connecting point, and (4) connecting mutually related pairs of connecting points unconnected to transfer terminals in such a way that connecting points associated with different time division multiplex links and different transfer directions form a pair; and a control unit for controlling said connecting means, in cooperation with control units of other exchanges, whereby a one-way closed loop for information transfer is established, among the exchanges which is synchronized by one of the synchronizing means of only one exchange at a time.

4. Method of transferring information via a digital telecommunication network which includes at least three digital exchanges where each exchange is connected via one two-way time division multiplex (TDM) line to one of the other exchanges, and via a two-way time division multiplex link to the other of said other exchanges, said exchanges each being provided with connection points for connecting a number of said two-way links, each including its own generator for generating a clock pulse and a synchronizing signal pattern and each including its own digital TDM switch connected to an associated subscriber equipment group, a first and second switch terminal of said TDM switch being used to transfer information coming from and going to said group, respectively, comprising the steps of enabling each exchange, by means of principally similar control functions in the exchange, to initiate the following functions:
- (a) connecting said generator to one of the connection points associated with the outgoing transfer direction from the exchange,
- (b) connecting said first and second switch terminal to only one of the connection points associated with the outgoing transfer direction and the incoming transfer direction at the exchange, respectively,
- (c) connecting mutually related pairs of the connection points not connected to the switch terminals, in such a way that points associated with different TDM links and different transfer directions form pairs, and the exchanges interacting cooperatively to establish, with the aid of said control function, a one-way encircling TDM loop going between all the exchanges of the network, only one of said generators generating the TDM clock pulse of the loop, and transferring via said loop information between subscriber equipments associated with different subscriber equipment groups.

* * * * *